(12) United States Patent
Kim et al.

(10) Patent No.: US 6,809,632 B2
(45) Date of Patent: Oct. 26, 2004

(54) METHOD FOR TRANSMITTING ADAPTIVE MULTI-CHANNEL PACKET IN POWER LINE COMMUNICATION SYSTEM

(75) Inventors: Jin-Tae Kim, Songnam (KR); Dai-Hyun Lim, Kwachon (KR)

(73) Assignee: Xeline Co., Ltd., Seoul (KR)

( * ) Notice: Subject to any disclaimer, the term of this patent is extended or adjusted under 35 U.S.C. 154(b) by 401 days.

(21) Appl. No.: 10/096,157

(22) Filed: Mar. 11, 2002

(65) Prior Publication Data

US 2003/0006883 A1 Jan. 9, 2003

(30) Foreign Application Priority Data

Jun. 20, 2001 (KR) ........................................ 2001-34954

(51) Int. Cl.[7] .......................... H04M 11/04; H04Q 7/00
(52) U.S. Cl. ............................. 340/310.01; 340/310.02; 340/310.06; 375/259; 370/333; 370/341; 370/437; 370/465
(58) Field of Search ................. 340/310.01–310.08; 375/322, 329, 332, 333, 341, 431, 437, 465, 912; 370/259, 240.02, 240.27

(56) References Cited

U.S. PATENT DOCUMENTS

| | | | |
|---|---|---|---|
| 4,499,499 A | 2/1985 | Brickman et al. | .......... 382/181 |
| 4,984,247 A | 1/1991 | Kaufmann et al. | .......... 375/141 |
| 5,166,951 A | 11/1992 | Schilling | .................... 375/145 |
| 5,608,738 A | 3/1997 | Matsushita | .................. 714/758 |
| 5,774,469 A | 6/1998 | Wirkestrand | ................ 340/473 |
| 6,334,219 B1 * | 12/2001 | Hill et al. | .................... 725/106 |
| 6,598,200 B1 * | 7/2003 | Greenwood et al. | ........ 714/774 |

* cited by examiner

*Primary Examiner*—Donnie L. Crosland
(74) *Attorney, Agent, or Firm*—Merchant & Gould P.C.

(57) ABSTRACT

A method for transmitting an adaptive multi-channel packet in power line communication system comprises the steps of: (a) transmitting a packet from a first node to a second node with a predetermined transmission speed through a power line by using a multi-channel in communication from the first node and the second node; (b) checking an error of the packet transmitted from the step (a) in the second node, thereafter loading the check result to the packet and transmitting it to the first node through the power line by using a multi-channel; (c) checking the result of the packet transmitted from the step (b) in the first node, and storing the check result as a database; (d) transmitting the packet to the second node with any one among the current, downgraded or upgraded transmission speeds through the power line according to the packet transmission success/failure information stored as the database in the step (c); and (e) transmitting the packet with a stable transmission speed according to the multi-channel by performing repeatedly the steps (b) to (d). Accordingly, the packet can be transmitted in an optimal speed suitable for the multi-channel environment, without requiring pre-communication for multi-channel adaptation among the nodes of the PLC system and a stable communication between the nodes connected to the power line can be performed.

7 Claims, 3 Drawing Sheets

METHOD FOR TRANSMITTING ADAPTIVE MULTI-CHANNEL PACKET IN POWER LINE COMMUNICATION SYSTEM

BACKGROUND OF THE INVENTION

1. Field of the Invention

The present invention relates to a power line communication system, and in particular to a method for transmitting an adaptive multi-channel packet in a power line communication system.

2. Description of the Background Art

In the power line communication (PLC), a radio frequency communication signal of a few hundreds Hz to a few tens MHz is transmitted together with an alternating power to a power line supplying the alternating power having frequencies of 50 to 60 Hz to houses, and a private access device receives only the communication signal for communicating. In the PLC, since there are no needs a high-priced private line or basic network, it can be used as an external network for internet access or a local area network (LAN) such as a home LAN through the connection with a plug receptacle, so it is a convenient and economical communication network suitable. Home appliances such as a TV, VCR and computer generate a volume of load in the power line.

The PLC is performed in a fixed transmission speed by using a fixed frequency region of a PLC channel. When the channel has a good property, the PLC stably obtains a wanted performance. However, when serious attenuation or distortion is generated in the PLC channel due to a load having a poor channel property, the communication quality is considerably deteriorated. The communication cannot be performed in the worst case.

When the PLC where a property of the channel is remarkably varied according to a frequency like the power line channel is performed by employing a fixed frequency, if a fixed frequency band has a poor property, a communication failure is generated.

SUMMARY OF THE INVENTION

Accordingly, it is an object of the present invention to provide a method for transmitting an adaptive multi-channel packet in a power line communication system which can transmit the packet in an optimal speed suitable for a multi-channel environment, without requiring pre-communication for multi-channel adaptation among the nodes of the power line communication system.

To achieve the above object of the present invention, there is provided a method for transmitting an adaptive multi-channel packet in power line communication system comprising the steps of: (a) transmitting a packet from a first node to a second node with a predetermined transmission speed through a power line by using a multi-channel in communication from the first node and the second node; (b) checking an error of the packet transmitted from the step (a) in the second node, thereafter loading the check result to the packet and transmitting it to the first node through the power line by using a multi-channel; (c) checking the result of the packet transmitted from the step (b) in the first node, and storing the check result as a database; (d) transmitting the packet to the second node with any one among the current, downgraded or upgraded transmission speeds through the power line according to the packet transmission success/failure information stored as the database in the step (c); and (e) transmitting the packet with a stable transmission speed according to the multi-channel by performing repeatedly the steps (b) to (d).

Preferably, the packet in the step (a) is a normal packet for transmitting system data and the packet in the step (b) is a control packet for transmitting packet error generation/non-generation information and its own address information.

Also, preferably, in the step (b), the error check of the packet transmitted from the first node through the power line with a predetermined transmission speed is performed by using a CRC(Cyclic Redundancy Check) method.

Preferably, the step (b) further comprises the steps of: (b1) checking the packet error by receiving the packet transmitted from the step (a) through the power line and thereafter when an error is generated in the packet as a result of the check, loading the packet error generation information and its own address information to the packet and transmitting it through the power line; and (b2) When an error is not generated in the packet as a result of the check in the step (b1), loading the packet error non-generation information and its own address information to the packet and transmitting it through the power line.

Also, in the step (c), the information is stored as a database in a media access controller (MAC) address.

Preferably, the database in the step (c) is periodically upgraded and a period is manually controlled according to a using environment.

Also, preferably, the step (d) further comprises the steps of: (d1) comparing the number of times of retransmission with a predetermined first reference value when the packet transmission fails according to the packet transmission success/failure information stored as a database in the step (c), retransmitting the packet to the second node through the power line with a predetermined transmission speed when the number of times of retransmission is smaller than the predetermined first reference value as the comparison result, and finishing the packet transmission when the number of times of retransmission is greater than the predetermined first reference value; (d2) comparing the number of times of transmission with a predetermined second reference value when the packet transmission is successfully performed according to the packet transmission success/failure information stored as a database in the step (c) and transmitting the packet to the second node through the power line in the current transmission speed at the next time when the number of times of transmission is smaller than the predetermined second reference value; (d3) comparing a transmission failure count value with a predetermined third reference value in the case that the number of times of transmission is greater than the predetermined second reference value as the comparison result of the step (d2) and thereafter transmitting the packet to the second node through the power line in a transmission speed downgraded by one step at the next time when the transmission failure count value is greater than the predetermined third reference value; (d4) comparing a transmission success count value with a predetermined fourth reference value when the transmission failure count value is smaller than the predetermined third reference value as the comparison result of the step (d3) and thereafter transmitting the packet to the second node through the power line in a transmission speed upgraded by one step at the next time when the transmission success count value is greater than the predetermined fourth reference value; and (d5) transmitting the packet to the second node through the power line in the current transmission speed at the next time in the case that the transmission success count value is smaller than the predetermined fourth reference value as the comparison result of the step (d4).

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A method for transmitting an adaptive multi-channel packet in a power line communication (PLC) system in accordance with a preferred embodiment of the present invention will now be described in detail with reference to the accompanying drawings.

Figure 1:
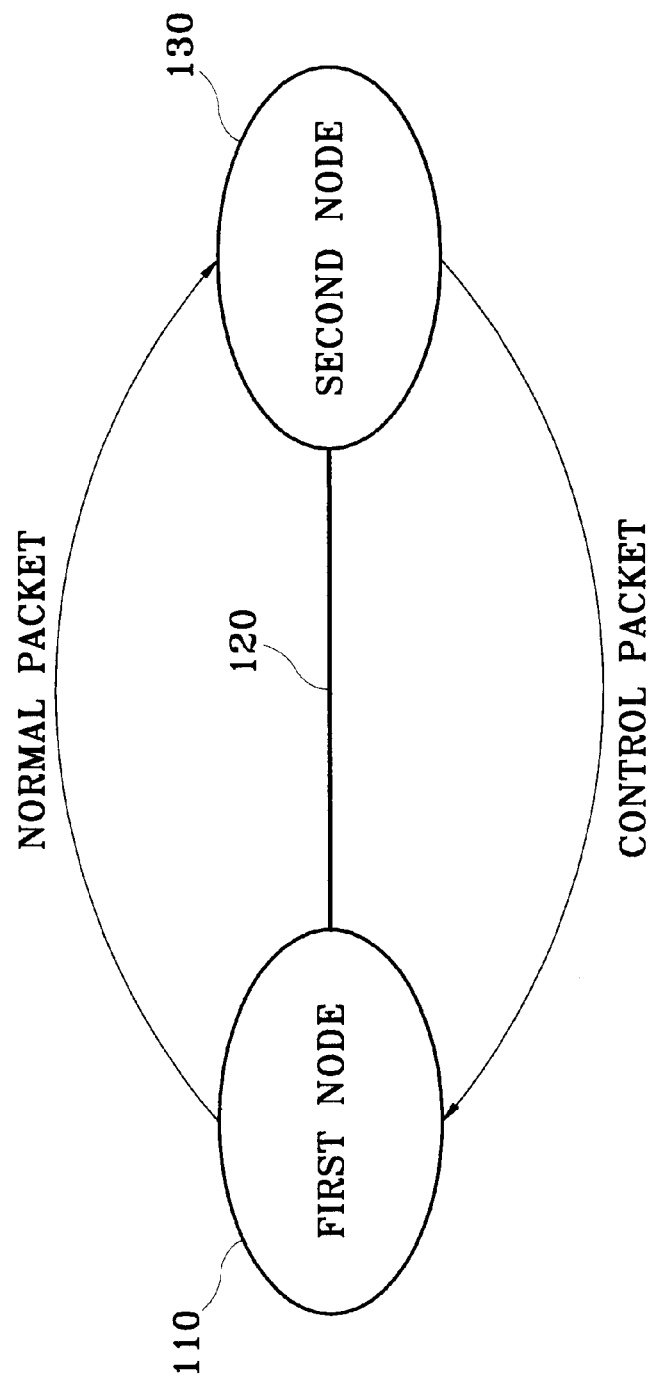
FIG. 1 is a structure diagram illustrating a power line communication system applied to the present invention.

FIG. 1 is a structure diagram illustrating the PLC system applied to the present invention. The PLC system includes: a first node 110, a power line 120 and a second node 130. Here, the first and second nodes 110 and 120 are connected to the power line 120. However, it is also possible to connect the first to n-th nodes to the power line 120.

Figure 2A:
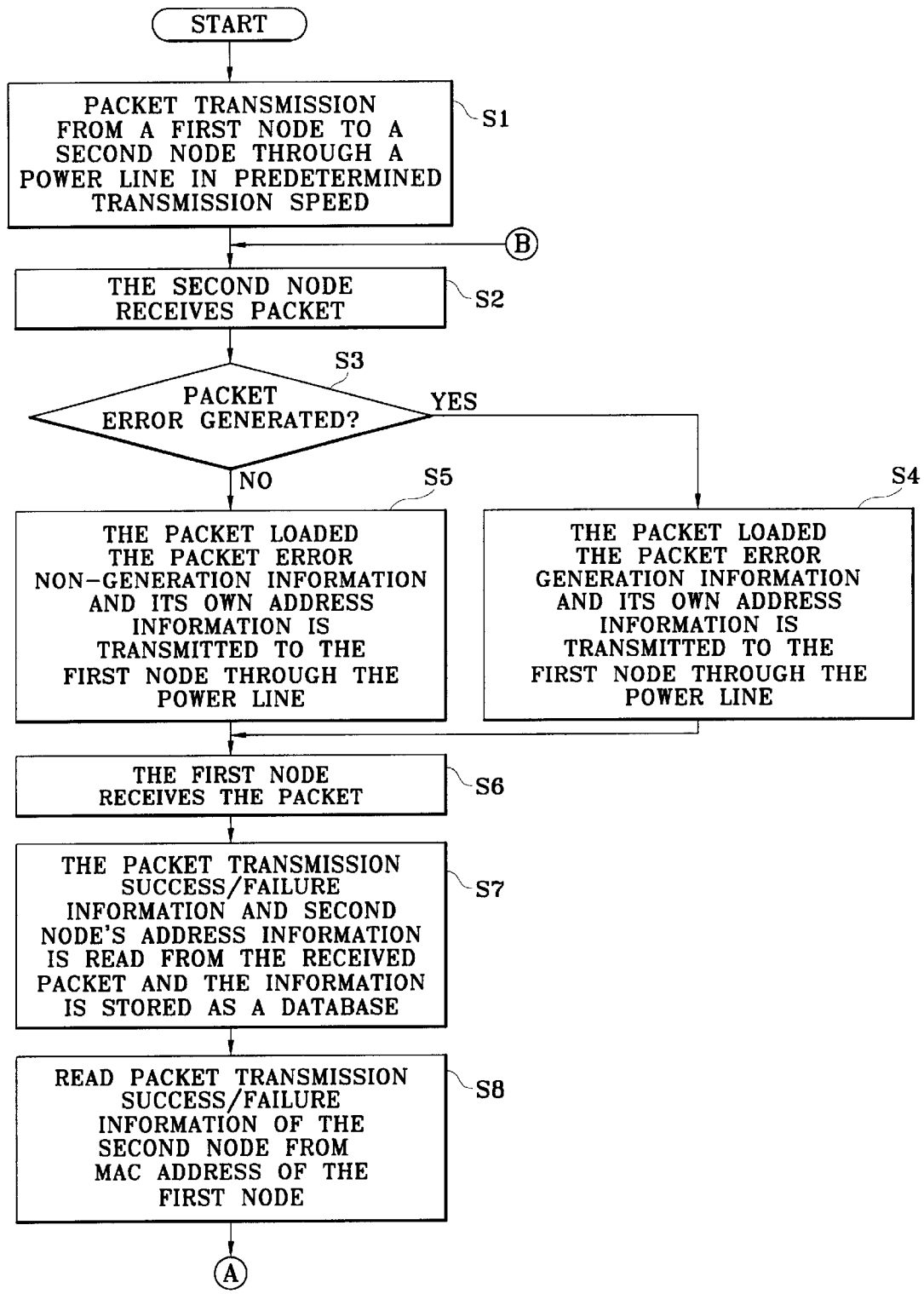
FIGS. 2a and 2b is a flowchart showing sequential steps of a method for transmitting an adaptive multi-channel packet in a power line communication system in accordance with the present invention.
Figure 2B:
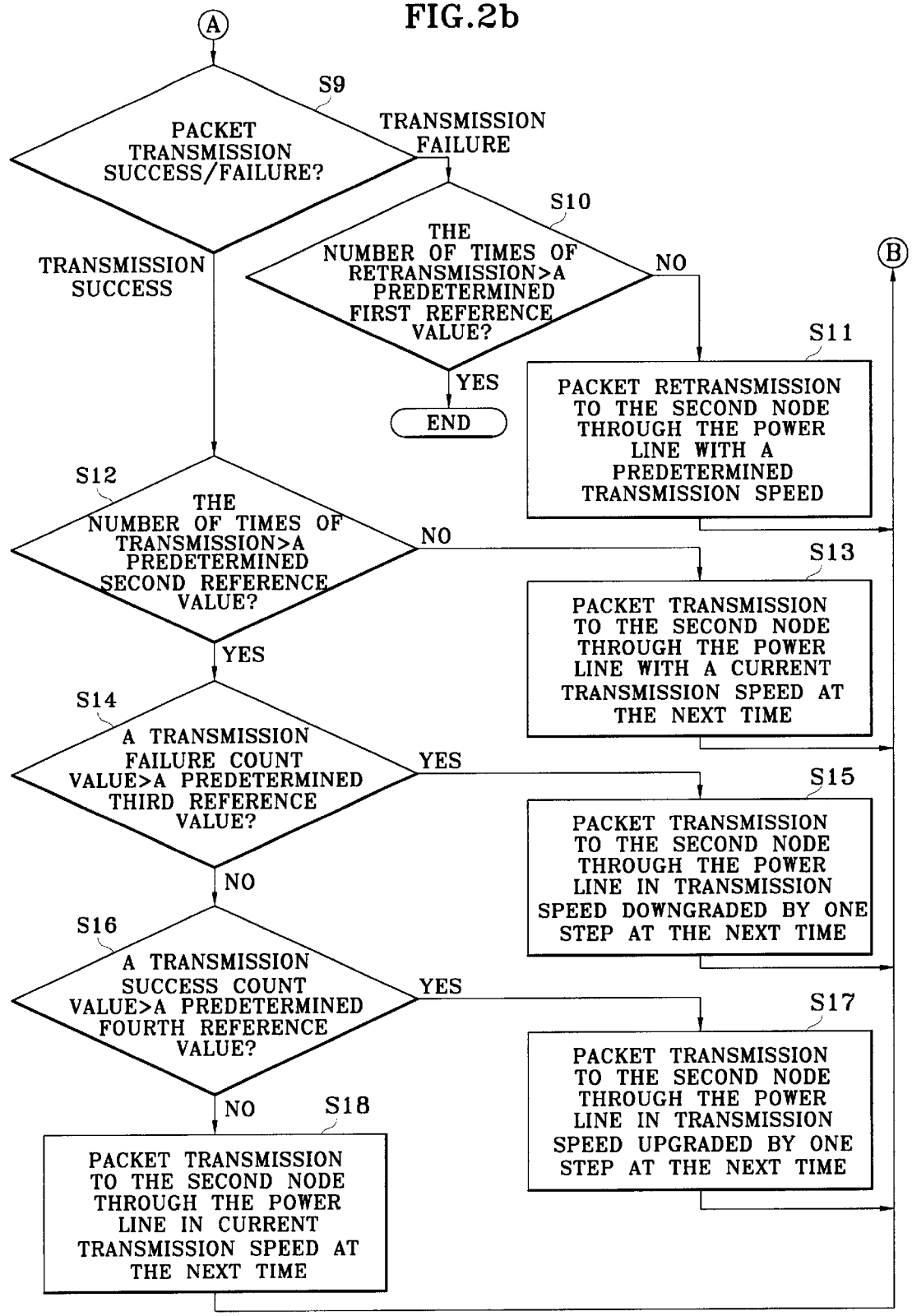

FIGS. 2a and 2b is a flowchart showing sequential steps of the method for transmitting the adaptive multi-channel packet in the PLC system in accordance with the present invention.

In a state where the first and second nodes 110 and 120 are connected through the power line 120, when a packet is transmitted from the first node 110 to the second node 130 through the power line 120 by using a multi-channel, a packet including the same information is transmitted with a predetermined transmission from the first node 110 to the second node 130 through the power line 120 (S1). Here, the packet transmitted from the first node 110 to the second node 130 is a normal packet used to transmit a system data.

For example, when there are presumed that the multi-channel employs four transmission frequency bands and the respective channels have a transmission speed of 1 Mbps, the packet including the same information in the four channels is transmitted with a transmission speed of 1 Mbps from the first node 10 to the second node 130 through the power line 120. The reason why the packet including the same information in the four channels is transmitted with a transmission speed of 1 Mbps from the first node 110 to the second node 130 through the power line 120 is as follows. Although the transmission speed of a packet including the same information in the four channels is slower than that of a packet including different information in the four channels with a transmission speed of 4 Mbps, when the packet including the same information in the four channels is transmitted from the first node 110 to the second node 130, if the packet is normally received in the second node 130 through at least one of the four channels according to a channel environment, a communication between the first node 110 and the second node 130 can be performed.

The second node 130 receives the packet from the first node 110 through the power line 120 in a predetermined transmission speed, and then a packet error is checked (S2 and S3).

When the error is generated in the packet as a result of the check, in the second node 130, the packet error generation information and its own address information is loaded to the packet having a predetermined transmission speed through a multi-channel and transmitted to the first node 110 through the power line 120 (S4). In the second node 130, the error check is performed by using cyclic redundancy check (CRC) method.

For instance, when the error occurs in the packet as a result of the check, in the second node 130, the packet error generation information and its own address information is loaded to the packet having a transmission speed of 1 Mbps through four channels, and transmitted to the first node 110 through the power line 120. The packet transmitted from the second node 130 to the first node 110 is a control packet for notifying packet error generation/non-generation information. Here, The reason why the packet loaded the packet error generation information and its own address information to the four channels with a transmission speed of 1 Mbps is transmitted from the second node 130 to the first node 110 through the power line 120 is as follows. That is, although the transmission speed of a packet including the same information in the four channels is slower than that of a packet including different information in the four channels with a transmission speed of 4 Mbps, when the packet including the same information in the four channels is transmitted from the first node 110 to the second node 130, if the packet is normally received in the second node 130 through at least one of the four channels according to a channel environment, a communication between the first node 110 and the second node 130 can be performed.

When an error is not generated in the packet as a result of the check, in the second node 130, the packet error non-generation information and its own address information is loaded to the four channels of the packet having a transmission speed of 1 Mbps and transmitted to the first node 110 through the power line 120 (S5).

The first node 110 receives the packet from the second node 130 through the power line 120 and then the packet error generation/non-generation information and the second node's address information is stored as a database in a media access controller (MAC) address as shown in Table 1 (S6 and S7). The database is periodically upgraded in the MAC address, and a period is manually controlled according to a using environment, such as 15 minutes, one hour and two hours.

TABLE 1

|  | MAC Address | Transmission Success | Transmission Failure | Current Transmission Speed |
|---|---|---|---|---|
| Second Node | 00-00-00-00-00-01 | 1 | 0 | 1 Mbps |
| . . . | . . . | . . . | . . . | . . . |

Thereafter, in the first node 110, the packet transmission success/failure information of the second node 130 is read from the database of the MAC address and the packet transmission success/failure is checked (S8 and S9).

When the packet transmission fails as a result of the check, in the first node 110, the number of times of retransmission is compared with a predetermined first reference value. When the number of times of retransmission is smaller than the predetermined first reference value, in the first node 110, the packet is retransmitted to the second node 130 through the power line 120 with a predetermined transmission speed and then the procedures of S2 to S9 are performed repeatedly, thereby upgrading the database. When the number of times of retransmission is greater than the predetermined first reference value, in the first node 110, since it indicates that the multi-channel environment using the power line 120 is an inferior state, the packet transmission is finished. On the other hand, when the packet transmission is successfully performed as a result of the check, in the first node 110, the number of times of transmission is compared with a predetermined second reference value (S10~S12).

When the number of times of transmission is smaller than the predetermined second reference value, in the first node 110, the packet is transmitted to the second node 130 through the power line 120 in the current transmission speed at the next time and then the procedures of the S2 to S12 are performed repeatedly, thereby upgrading the database. In the case that the number of times of transmission is greater than the predetermined second reference value, in the first node 110, a transmission failure count value is compared with a predetermined third reference value (S13 and S14).

When the transmission failure count value is greater than the predetermined third reference value as a result of the comparison, in the first node 110, the packet is transmitted to the second node 130 through the power line 120 in a transmission speed downgraded by one step at the next time and then the procedures of S2 to S14 are performed repeatedly, thereby upgrading the database. When the transmission failure count value is smaller than the predetermined third reference value as a result of the comparison, in the first node 110, a transmission success count value is compared with a predetermined fourth reference value (S15 and S16). It will now be exemplified that in the first node 110, the packet is transmitted to the second node 130 through the power line 120 in a transmission speed downloaded by one step. In the first node 110, the packet loaded the same information to the two channels and different information to the two channels is transmitted to the second node 130 through the power line 120 in a transmission speed of 3 Mbps. Thereafter, as a comparison result of S12, when the transmission failure count value is smaller than the predetermined third reference value, in the first node 110, the packet loaded the same information to the every two channels is transmitted to the second node 130 through the power line 120 in a transmission speed of 2 Mbps and then the procedures of S2 to S14 are performed repeatedly, thereby upgrading the database.

On the other hand, when the transmission success count value is greater than the predetermined fourth reference value as a result of the comparison, in the first node 110, the packet is transmitted to the second node 130 through the power line 120 in a transmission speed upgraded by one step at the next time and then the procedures of S2 to S16 are performed repeatedly, thereby upgrading the database. In the case that the transmission success count value is smaller than the predetermined fourth reference value, in the first node 110, the packet is transmitted to the second node 130 through the power line 120 in the current transmission speed at the next time (S17 and S18).

It will now be exemplified that in the first node 110, the packet is transmitted to the second node 130 through the power line 120 in a transmission speed upgraded by one step. In the first node 110, the packet loaded different information to the four channels is transmitted to the second node 130 through the power line 120 in a transmission speed of 4 Mbps. As a comparison result of S16, when the transmission success count value is greater than the predetermined fourth reference value, in the first node 110, the packet is transmitted to the second node 130 through the power line 120 in a transmission speed upgraded by one step at the next time and then the procedures of S2 to S16 are performed repeatedly, thereby upgrading the database.

The aforementioned procedures are repeatedly performed, so that in the first node 110, the packet can stably be transmitted/received to/from the second node 130 through the power line 120.

As discussed earlier, in accordance with the present invention, the packet can be transmitted in an optimal speed suitable for the multi-channel environment, without requiring pre-communication for multi-channel adaptation among the nodes of the PLC system. Accordingly, a stable communication between the nodes connected to the power line can be performed.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for transmitting an adaptive multi-channel packet in power line communication system comprising the steps of:
    (a) transmitting a packet from a first node to a second node with a predetermined transmission speed through a power line by using a multi-channel in communication from the first node and the second node;
    (b) checking an error of the packet transmitted from the step (a) in the second node, thereafter loading the check result to the packet and transmitting it to the first node through the power line by using a multi-channel;
    (c) checking the result of the packet transmitted from the step (b) in the first node, and storing the check result as a database;
    (d) transmitting the packet to the second node with any one among the current, downgraded or upgraded transmission speeds through the power line according to the packet transmission success/failure information stored as the database in the step (c); and
    (e) transmitting the packet with a stable transmission speed according to the multi-channel by performing repeatedly the steps (b) to (d).

2. The method of claim 1, wherein the packet in the step (a) is a normal packet for transmitting system data and the packet in the step (b) is a control packet for transmitting packet error generation/non-generation information and its own address information.

3. The method of claim 1, wherein in the step (b), the error check of the packet transmitted from the first node through the power line with a predetermined transmission speed is performed by using a CRC(Cyclic Redundancy Check) method.

4. The method of claim 1, wherein the step (b) further comprises the steps of:

(b1) checking the packet error by receiving the packet transmitted from the step (a) through the power line and thereafter when an error is generated in the packet as a result of the check, loading the packet error generation information and its own address information to the packet and transmitting it through the power line; and (b2) When an error is not generated in the packet as a result of the check in the step (b1), loading the packet error non-generation information and its own address information to the packet and transmitting it through the power line.

5. The method of claim 1, wherein in the step (c), the information is stored as a database in a media access controller (MAC) address.

6. The method of claim 1, wherein the database in the step (c) is periodically upgraded and a period is manually controlled according to a using environment.

7. The method of claim 1, wherein the step (d) further comprises the steps of:

(d1) comparing the number of times of retransmission with a predetermined first reference value when the packet transmission fails according to the packet transmission success/failure information stored as a database in the step (c), retransmitting the packet to the second node through the power line with a predetermined transmission speed when the number of times of retransmission is smaller than the predetermined first reference value as the comparison result, and finishing the packet transmission when the number of times of retransmission is greater than the predetermined first reference value;

(d2) comparing the number of times of transmission with a predetermined second reference value when the packet transmission is successfully performed according to the packet transmission success/failure information stored as a database in the step (c) and transmitting the packet to the second node through the power line in the current transmission speed at the next time when the number of times of transmission is smaller than the predetermined second reference value;

(d3) comparing a transmission failure count value with a predetermined third reference value in the case that the number of times of transmission is greater than the predetermined second reference value as the comparison result of the step (d2) and thereafter transmitting the packet to the second node through the power line in a transmission speed downgraded by one step at the next time when the transmission failure count value is greater than the predetermined third reference value;

(d4) comparing a transmission success count value with a predetermined fourth reference value when the transmission failure count value is smaller than the predetermined third reference value as the comparison result of the step (d3) and thereafter transmitting the packet to the second node through the power line in a transmission speed upgraded by one step at the next time when the transmission success count value is greater than the predetermined fourth reference value; and (d5) transmitting the packet to the second node through the power line in the current transmission speed at the next time in the case that the transmission success count value is smaller than the predetermined fourth reference value as the comparison result of the step (d4).

* * * * *